United States Patent [19]
Blanding

[11] Patent Number: 5,772,158
[45] Date of Patent: Jun. 30, 1998

[54] APPARATUS FOR LATERALLY OFFSETTING POWER LINES FROM UTILITY POLES

[76] Inventor: Douglas Blanding, 1016 Smithridge Rd., Bridgeport, N.Y. 13030

[21] Appl. No.: 759,265

[22] Filed: Dec. 2, 1996

[51] Int. Cl.$^6$ ...................................................... F16L 3/00
[52] U.S. Cl. .......................................... 248/49; 174/45 R
[58] Field of Search ........................... 248/49, 66, 125.2, 248/125.7, 125.8, 127, 146; 174/45 R, 149; 52/40, 736.2, 651.02

[56] References Cited

U.S. PATENT DOCUMENTS

| | | | |
|---|---|---|---|
| 1,680,573 | 8/1928 | Shickluna | 174/45 R |
| 3,001,749 | 9/1961 | Petersen | 248/49 |
| 3,649,740 | 3/1972 | Boyer et al. | 174/45 R |
| 4,127,739 | 11/1978 | Farmer | 174/45 R |
| 4,194,080 | 3/1980 | Meisberger | 14/45 R |
| 4,314,434 | 2/1982 | Meisberger | 174/45 R |
| 4,625,839 | 12/1986 | Cockburn et al. | 174/45 R |
| 4,679,672 | 7/1987 | Seddon et al. | 174/45 R |
| 5,445,348 | 8/1995 | Caldwell et al. | 174/45 R |

*Primary Examiner*—Ramon O. Ramirez
*Assistant Examiner*—Anita M. King

*Attorney, Agent, or Firm*—George R. McGuire

[57] ABSTRACT

A combination of apparatus for laterally offsetting power lines from a utility pole, and maintaining the utility pole in an essentially vertical orientation and statically balanced condition. A truss assembly is pivotally mounted to a utility pole adjacent the top thereof. The truss includes a tubular member which extends in laterally spaced, parallel relation to a utility pole, and which receives therethrough an elongated rod adapted to securely receive and support several types of power lines. The elongated rod includes several insulated candlesticks, or wire receiving members, on its top end, and includes several, longitudinally spaced holes formed transversely therethrough, each one of which operably receives an insulated, wire receiving bolt. To counteract the unbalanced load placed on the utility pole by the laterally offset power lines, a guy wire is attached at its ends to the upper and lower ends of the utility pole. The guy wire passes around a pulley assembly which is adjustably interconnected to the utility pole. By adjusting the lateral distance separating the pulley assembly from the utility pole, the tension in the guy wire is correspondingly adjusted. Accordingly, by adjusting the tension in the guy wire to counter-act the unbalanced load put on the utility pole by the offset power lines, the utility pole will be maintained in an essentially vertical orientation and in a statically balanced condition.

17 Claims, 4 Drawing Sheets

APPARATUS FOR LATERALLY OFFSETTING POWER LINES FROM UTILITY POLES

BACKGROUND OF THE INVENTION

The present invention relates generally to supports for overhead power lines, and more particularly to such supports which hold the power lines in laterally spaced relation to a telephone pole.

Utility poles support several different types of power lines in vertically spaced relation above the ground. Some of the most common types of supported power lines are the primary and secondary (neutral) electric lines, CATV lines, and telephone lines. For the power companies who must construct and maintain these overhead lines, it is most cost effective to run the lines in as straight a line as possible. Due to the presence of physical obstacles however, the line supporting poles are often positioned in a staggered pattern, thereby causing the overhead lines to run with several angular offsets between the first and last poles in a given run.

As a consequence of the staggered pattern of poles, the lines produce not only a vertical load bearing force on the poles, but also a resultant force caused by the unbalanced load created by the angles at which the power lines are offset. To compensate for this extra force, additional reinforcements must be constructed to ensure that the lines are safely and securely supported above the ground.

The additional reinforcement may be a bracing member, such as an additional pole, mounted in the proximity of the displaced pole and having a span guy wire extending in supporting relation to the displaced pole. The use of these bracing members may require obtaining the necessary right of ways for the placement thereof, and adds significant material and labor costs for its installation and maintenance. When many braces are needed to support all the displaced poles in a given electrical network, the added costs are extraordinarily high, a cost which is ultimately passed on to the consumers.

When circumstances arise requiring a pole that is already in a straight run of poles to be moved out of that straight run, additional expenses are incurred. A road reconstruction project is a common example of such a circumstance. To compensate for the line's angular offset resulting from the movement of one pole, and to alleviate the unbalanced load put on the displaced pole, a string of three to six consecutive poles will be moved to lessen the abruptness of the angular offset. Movement of this many poles requires much time and labor to complete, thereby escalating the cost to the company responsible for moving the poles. Additionally, it may be necessary to install bracing members to further secure the poles supporting the offset lines, thereby further escalating the cost. To further add to the cost, it is sometimes necessary, as well as difficult, to also get new right of ways to move the poles.

It is therefore a principal object of the present invention to provide an apparatus which permits power lines to be securely supported in laterally spaced relation to a pole.

It is an additional object of the present invention to provide an apparatus for offsetting power lines from utility poles that may easily be used on existing power lines or new power lines.

It is a further object of the present invention to provide a power line supporting apparatus which will reduce power line labor, maintenance and material costs for utility companies.

It is yet a further object of the present invention to provide a power line supporting apparatus which is inexpensive to manufacture and simple to use.

Other objects and advantages of the present invention will in part be obvious and in part appear hereinafter.

SUMMARY OF THE INVENTION

In accordance with the foregoing objects and advantages, the present invention provides an apparatus for holding and supporting a power line in laterally offset relation to a utility pole. The apparatus generally includes an elongated mounting member adapted to be securely attached in parallel, contacting relation to a telephone pole, a truss-like assembly releasably and rotatably secured to the elongated member, and a power line holding member releasably secured to the truss-like assembly in spaced, parallel relation to telephone pole. Due to the power lines being supported in laterally spaced relation to the pole, the lines' weight creates a moment on the pole which will ultimately cause the pole to tilt. To compensate, the present invention incorporates an adjustable tension wire system to counter-act the moment created by the power lines, thereby ensuring that the pole's posture remains truly vertical.

The truss assembly includes a first, vertically oriented tube adapted to be rotatably attached to the elongated, mounting member that is fixedly secured to the pole. A second tube is fixedly attached to and extends horizontally away from the top of the first tube, and a third tube is fixedly attached to and extends diagonally upwardly from the lower end of the first tube. The distal ends of the second and third tubes extend in a common, vertical plane and terminate in vertically aligned relation to one another, and are fixedly attached to a fourth tube that extends in spaced, parallel relation to the utility pole, and hence, the first tube. The fourth tube releasably receives an elongated rod therethrough. A pair of screws securely hold the elongated rod in position.

The elongated rod includes a plurality of candlesticks attached to its upper end for securely supporting primary electrical wires. A series of holes spaced along the rod's longitudinal axis are formed therethrough, each hole being positioned to receive a bolt having a wire attachment device integral therewith. The bolts then may have a secondary electrical wire, a CATV wire, or a telephone wire attached thereto. The holes are spaced sufficiently apart to maintain separation of the various wires at great enough distances so as to comply with FCC regulations and prevent any interference with the signals passing therethrough. Alternatively, additional candlesticks may be attached in longitudinally spaced relation along the elongated rod for supporting the various wires.

As a consequence of the wires being supported in laterally spaced relation to the pole, the pole experiences forces and a moment created by the weight of the wires and the distance they are from the pole. Although these forces and moment will not initially cause any deflection in the pole, the constant stress may ultimately result in the pole tilting in the direction of the moment.

To compensate for the forces and moment, a guy wire assembly is mounted on the opposite side of the pole as the wire support assembly. The guy wire assembly includes a guy wire fixedly secured at the upper and lower ends of the pole, and an adjustable pulley system over which the guy wire passes, mounted at an intermediate position along the pole, adjacent its top end. The adjustable pulley system permits selective control of the tension in the guy wire, and is adjustable along a linear axis perpendicularly towards or away from the pole. By adjusting the pulley to a position farther away from the pole, the tension in the guy wire increases and the tension force will pull (tilt) the pole towards the guy wire assembly. Thus, if the forces and moment created by the wires cause the pole to tilt in one direction, the pulley system can be selectively adjusted to increase the tension in the guy wire to counter those forces and moment and keep the pole in a statically balanced, true, vertical position.

BRIEF DESCRIPTION OF THE DRAWINGS

The foregoing and other features of the invention will be more readily understood and fully appreciated from the following Detailed Description, taken in conjunction with the accompanying drawings, wherein.

DETAILED DESCRIPTION

Figure 1:
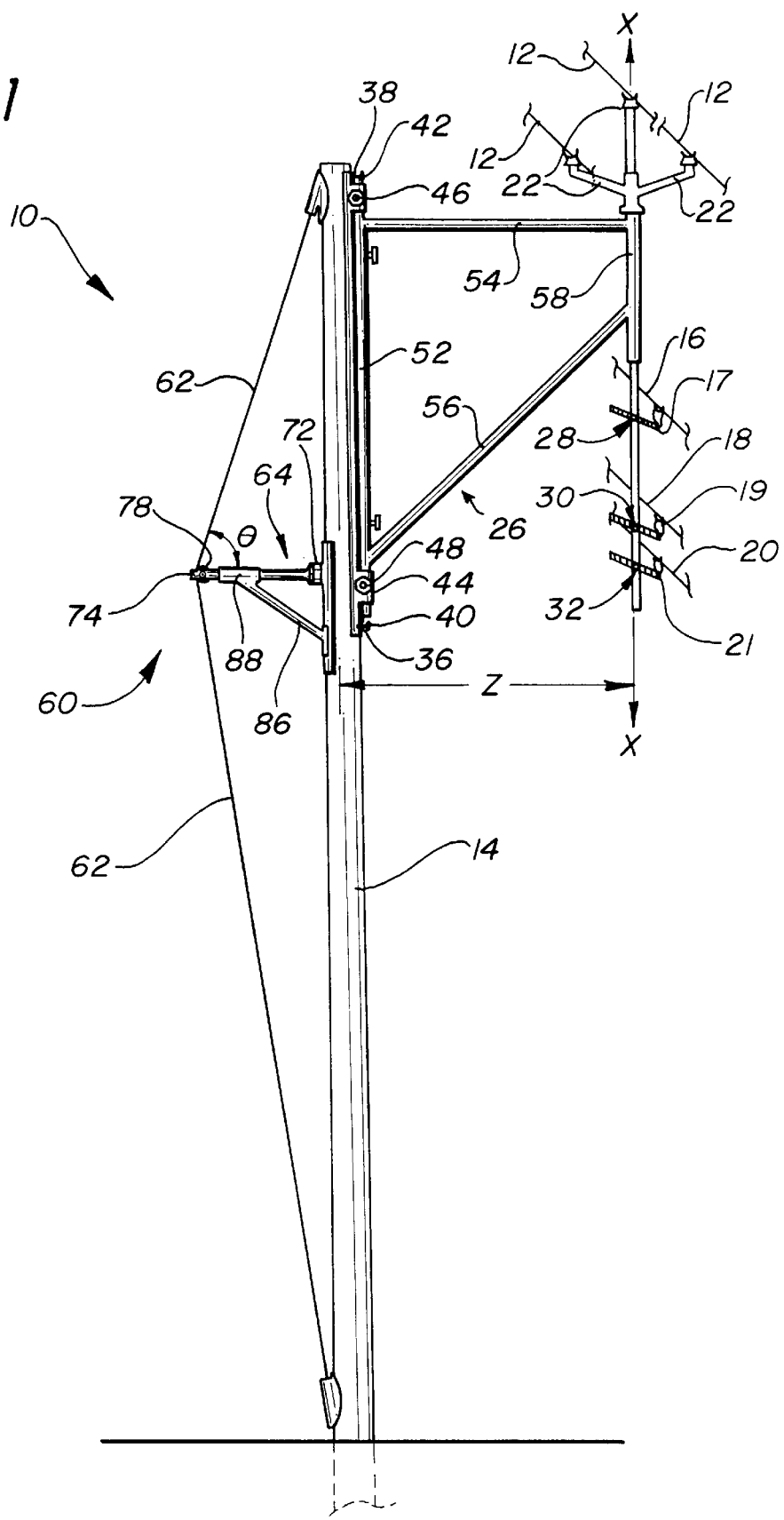
FIG. 1 is a side elevational view of the present invention.

Referring now to the drawing figures, wherein like reference numerals refer to like parts throughout, there is seen in FIG. 1 an apparatus, denoted generally by reference numeral 10, for both supporting a plurality of power lines 12 in laterally spaced relation to a utility pole 14 and keeping the pole in a truly vertical orientation. Apparatus 10 is also capable of supporting a secondary (grounding) wire 16, a CATV line 18, and a telephone line 20, all position in vertically spaced relation to one another and in laterally spaced relation to pole 14.

Lines 12 are attached to respective candlesticks 22 which, in turn, are securely attached to a rod 24 which is statically held in spaced, parallel relation to pole 14 by a truss assembly, denoted generally by reference numeral 26, to which it is attached by bolts 27. Transmission lines 16, 18 and 20 are attached to conventional utility line receiving bolts 17, 19 and 21 which pass through holes 28, 30 and 32, respectively. Holes 28, 30 and 32 are formed through rod 24 at predetermined spaced intervals along the rod's longitudinal axis X—X, and at distances far enough apart to ensure that the signals passing through wires 16, 18, and 20 will not interfere with one another. Alternatively, wires 16, 18, and 20 could be supported by candlesticks in the same manner as lines 12.

Figure 2:
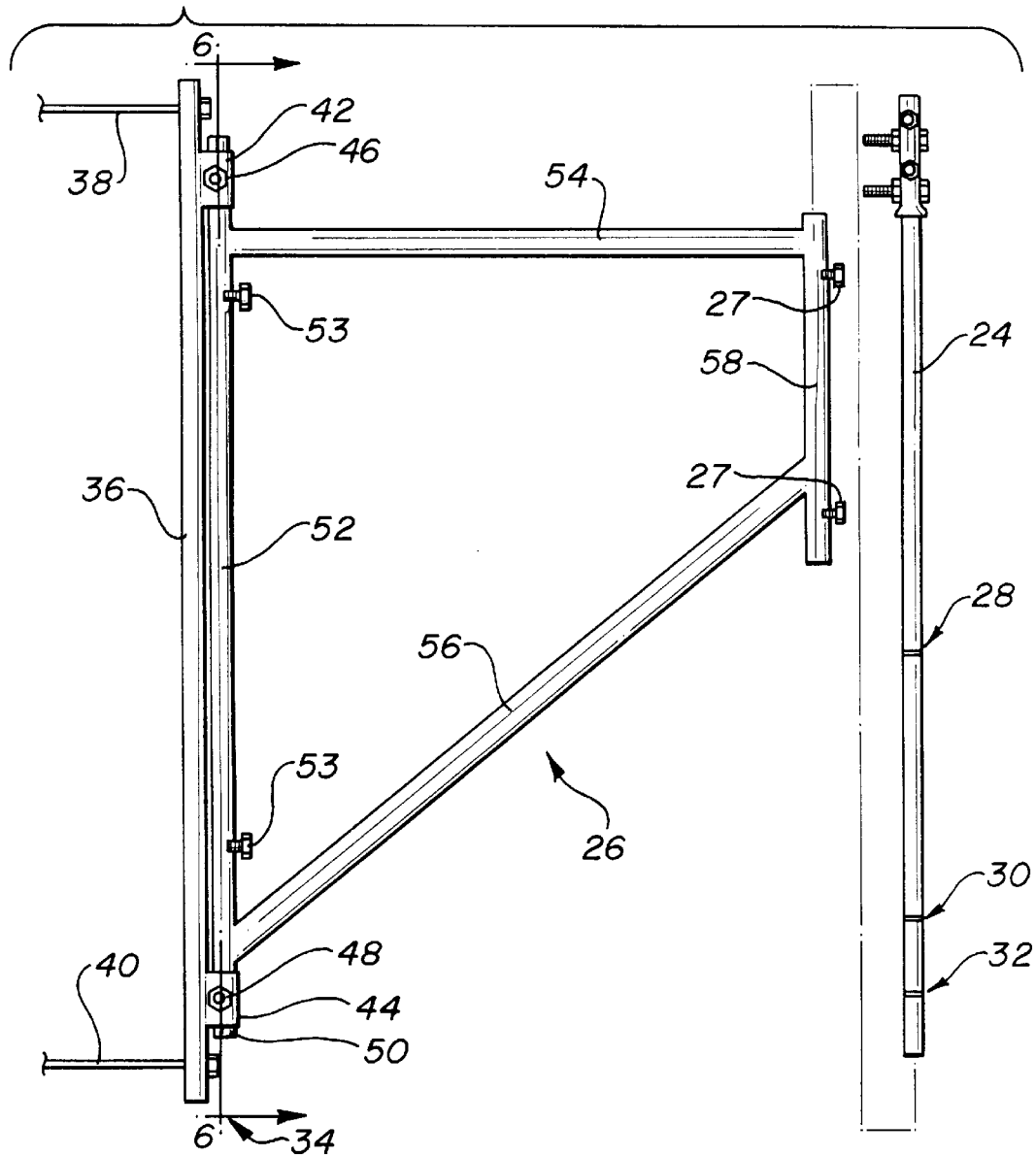
FIG. 2 is an enlarged, side elevational view showing the line holding member exploded away from the truss assembly.
Figure 3:
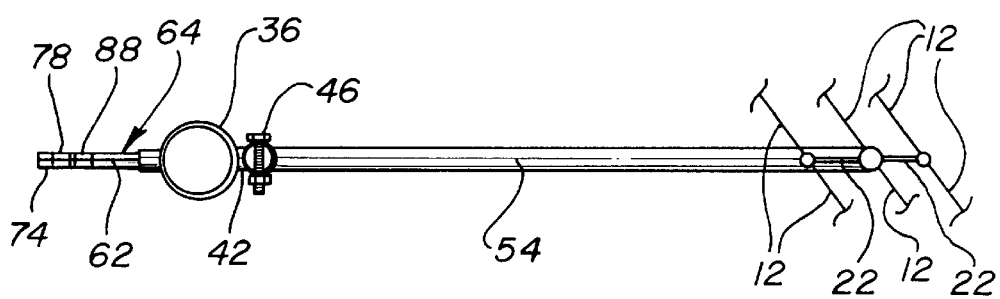
FIG. 3 is a top plan view of the present invention.

Truss assembly 26 is rotatably connected to pole 14 through a mounting structure, denoted generally by reference numeral 34, seen most clearly in FIG. 2. Mounting structure 34 includes an elongated shaft 36 fixedly attached, and extending in contacting, parallel relation to pole 14 by a pair of bolts 38 and 40 positioned adjacent the top and bottom of shaft 36, respectively. Shaft 36 has a cross-sectional shape which conforms to the shape of pole 14 to provide an effective, non-slip mounting for supporting truss 26. A pair of upper and lower flanges 42 and 44, respectively, integrally extend outwardly from shaft 36, and each includes a bolt 46 and 48, respectively, which pass therethrough and engage an elongated rod 50 which they hold in fixed, parallel, spaced relation to shaft 36. Although rod 50 is shown in FIG. 2, it is most clearly seen in FIG. 6.

Figure 6:
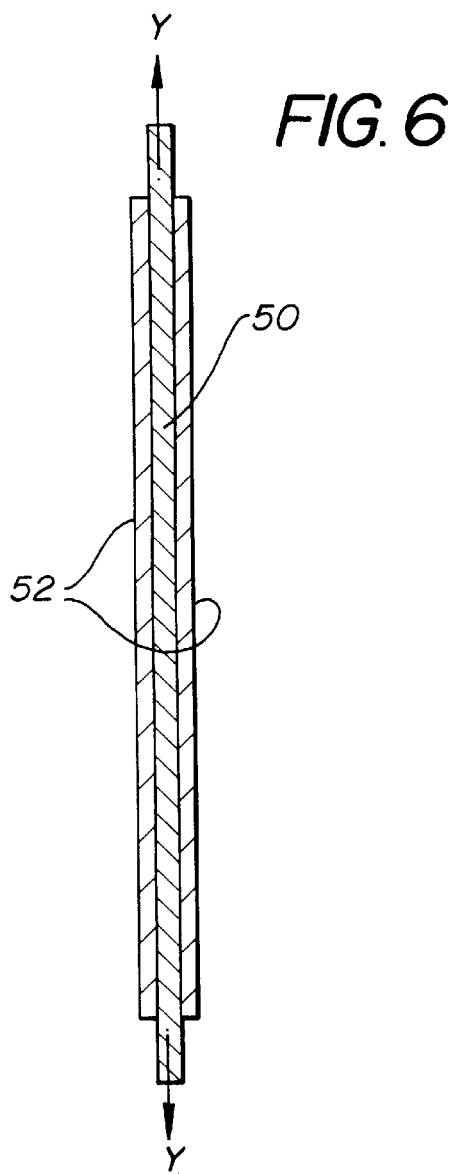
FIG. 6 is a cross-sectional view of the pivot arm of the truss assembly taken along line 6—6 of FIG. 2.

With particular reference to FIGS. 2 and 6, truss assembly 26 is rotatably connected to mounting structure 34 by a first tube 52 which forms a portion of truss 26, and is co-axially positioned, in sleeve-like relation, over rod 50 to which it is releasably secured by a pair of set screws 53. Although there is some friction between the internal surface of tube 52 and the exterior surface of rod 50, tube 52 may be manually rotated about the rod's longitudinal axis Y—Y (see FIG. 6) to any desired orientation with respect to pole 14. Fixedly attached to the upper end of first tube 52 is a second tube 54 which extends perpendicularly (horizontally) outwardly therefrom. A third tube 56 is fixedly attached to the lower end of first tube 52, and extends diagonally upwardly therefrom and in a common vertical plane with second tube 54. The distal ends of second tube 54 and third tube 56 terminate in spaced, but vertically aligned relation to one another, and are both fixedly attached to a fourth tube 58 which extends in laterally spaced, parallel relation to first tube 52 and pole 14. It is this fourth tube 58 through which line supporting rod 24 co-axially extends along axis X—X, and to which it is releasably connected via bolts 27.

Accordingly, lines 12, 16, 18 and 20 are securely supported a lateral distance Z from pole 14, where Z is the distance rod 24 is from the center of pole 14. Therefore, the unbalanced load of wires 12, 16, 18 and 20 produces forces and a moment acting on pole 14. Although these moment and forces will initially have no observable effect on pole 14, it could eventually cause pole 14 to tilt, and finally fall over, thereby causing the lines to fall as well.

To counteract the moment and forces created by the offset wires, an adjustable, guy wire tension system, denoted generally by reference numeral 60, is mounted on the diametrically opposite side of pole 14 as mounting structure 34. System 60 permits a series of equal and opposite forces and a moment to those created by the wires to be imposed on pole 14, thereby maintaining the pole in a statically balanced condition.

Tension system 60 generally includes a guy wire 62 securely attached at its ends to the top and bottom of pole 14, and a pulley assembly, denoted generally 64, attached at an intermediate position along the length of pole 14. The tension in guy wire 62 is selectively adjustable through manual manipulation of pulley assembly 64. By adjusting the tension until the tension forces and the effective moment arm produce a series of forces and a moment equal and opposite to those forces and moment created by the wires 12, 16, 18 and 20, pole 12 will remain statically balanced in a truly vertical position.

Figure 4:
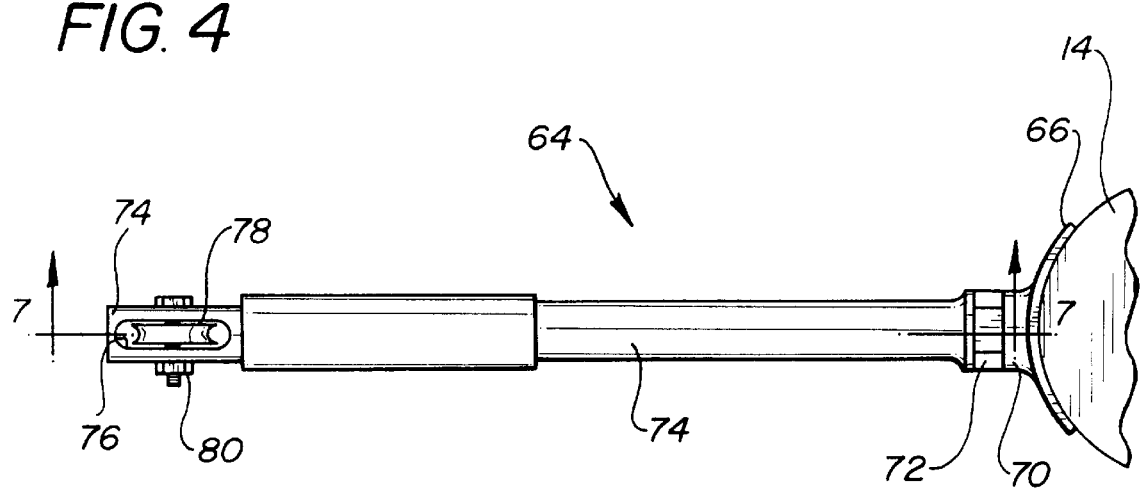
FIG. 4 is a top plan view of the guy wire, pulley assembly.
Figure 5:
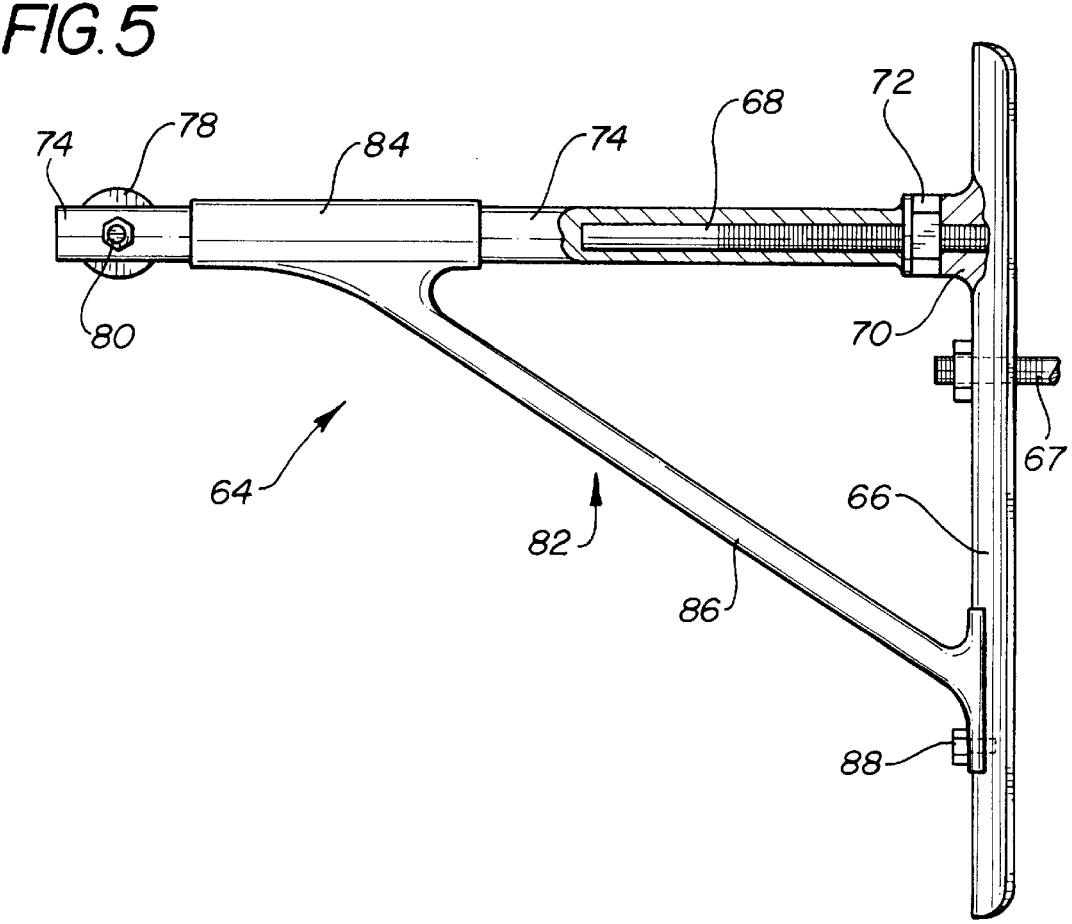
FIG. 5 is a side elevational view of the guy wire, pulley assembly.
Figure 7:
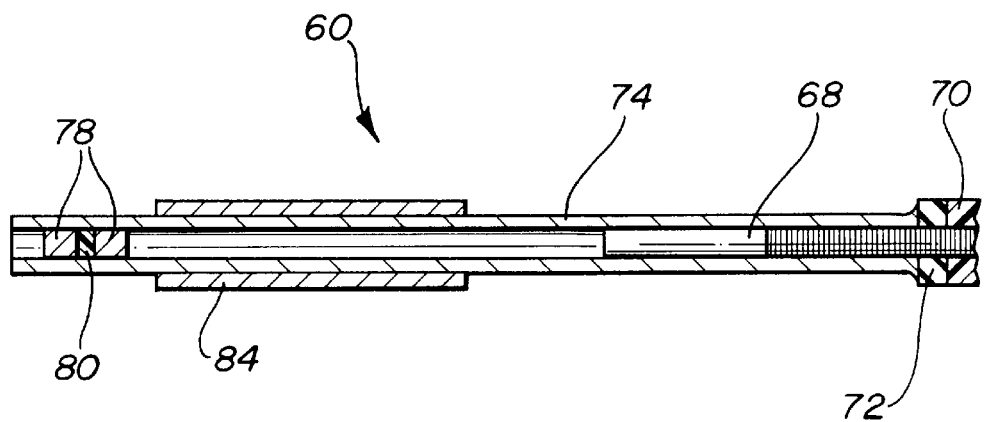
FIG. 7 is a cross-sectional view of the guy wire, pulley assembly taken along section line 7—7 of FIG. 4.

With particular reference to FIGS. 4, 5 and 7, pulley assembly 64 is fixedly attached to pole 14 by a mounting shaft 66 which contours, and is fixedly attached to pole 14 by a bolt 67. A threaded rod 68 securely passes through a flange 70 integrally extending from shaft 66, adjacent the top thereof, thereby extending itself perpendicularly outwardly from shaft 66. An adjustment bolt 72 is threaded onto shaft 68, and a tube 74 is positioned in co-axial, sleeve-like relation to rod 68, and with its proximal end in abutting relation to bolt 72. An opening 76 is formed through tube 74, adjacent its distal end, in which a pulley 78 is rotatably secured via a pin 80. As guy wire 62 extends from the top to the bottom of pole 14, it passes over pulley 78 and through opening 76, thereby creating a horizontally and inwardly directed force to pulley 78, and hence to tube 74, thereby maintaining the tube in abutting relation to bolt 72.

A bracing member 82 includes a sleeve 84 positioned around tube 74, and a shaft 86 extending diagonally downwardly from sleeve 84 to mounting shaft 66 to which it is fixedly attached by a bolt 88. Bracing member 82 prevents the horizontal force created by guy wire 62 on pulley 78 (and hence tube 74) from deflecting or deforming tube 74.

To adjust the tension in guy wire 62, bolt 72 may be manually threaded along the longitudinal axis of rod 68, either away from or towards pole 14 in order to increase or decrease the tension, respectively. Due to the abutment of tube 74 to bolt 72, by threading bolt 72 away from pole 14, tube 74 would also be forced away from pole 14, thereby stretching wire 62 and consequently causing the tension in the wire to increase. By threading bolt 72 towards pole 14, the force created by wire 62 on pulley 78 causes tube 74 to also move towards pole 14, thereby producing some slack in wire 62 and consequently decreasing the tension in the wire. Thus, pulley 78 may be selectively moved along the longitudinal axis of rod 68 to adjust the tension in wire 62, and hence control the tension forces and moment acting on one side of pole 14, thereby statically balancing the pole.

What is claimed is:

1. A combination of an apparatus for supporting a plurality of power lines in vertically spaced relation above the ground and in laterally offset relation to a utility pole having a predetermined contour, and an upper and a lower end, and an apparatus for maintaining said utility pole in a vertical orientation and in a statically balanced condition, said combination of apparatus comprising:
   a) means for supporting said plurality of power lines in laterally offset relation to said utility pole, said support means comprising:
      i) a truss assembly including a first, elongated tubular member having a longitudinal axis which extends in spaced, parallel relation to said utility pole, whereby said truss assembly is interconnected to said utility pole, adjacent its said upper end;
      ii) a first, elongated rod having a longitudinal axis, and which is releasably attached to said first, elongated tubular member and extends co-linearly therethrough, said first, elongated rod being adapted to securely hold and support said plurality of power lines in vertically spaced relation above said ground; and
      iii) means for interconnecting said truss assembly to said utility pole; and
   b) means for maintaining said utility pole in an essentially vertical orientation.

2. The combination of claim 1 wherein said truss assembly further includes a second, elongated tubular member having a longitudinal axis which extends in spaced, parallel relation to said first, elongated tubular member's longitudinal axis, and said truss assembly further including at least two elongated members each having first and second opposite ends which are integrally attached to said first and second, elongated tubular members, respectively.

3. The combination of claim 2 wherein said truss assembly is selectively pivotal about said second, elongated tubular member's longitudinal axis.

4. The combination of claim 3 wherein said means for interconnecting said truss assembly to said utility pole includes:
   a) a first, elongated mounting member fixedly attached to said utility pole;
   b) a second, elongated rod fixedly attached to said elongated mounting member, whereby said second, elongated rod extends in spaced, parallel relation to said utility pole;
   c) said second, elongated tubular member being positioned in sleeve-like, co-linearly extending relation to said second, elongated rod; and
   d) means for securely fastening said second, elongated tubular member to said second, elongated rod.

5. The combination of claim 4 wherein said fastening means includes at least one set screw passing through said second, elongated tubular member and engaging said second, elongated rod.

6. The combination of claim 4 wherein said first, elongated mounted member has a cross-sectional shape adapted to conform to said contour of said utility pole.

7. The combination of claim 1 wherein said first elongated rod includes first and second opposite ends and a plurality of holes formed transversely therethrough at longitudinally spaced intervals therealong.

8. The combination of claim 7 and further including a plurality of wire receiving candlesticks fixedly attached to said first end of said first, elongated rod, and a plurality of wire receiving bolts, wherein one of said bolts threadingly passes through each of said plurality of holes formed through said first, elongated rod.

9. The combination of claim 1 wherein said means for maintaining said utility pole in an essentially vertical orientation includes:
   a) a wire having a predetermined tension, and first and second opposite ends securely attached to said utility pole's upper and lower ends, respectively; and
   b) a pulley assembly interconnected to said utility pole.

10. The combination of claim 9 wherein said pulley assembly includes:
   a) a second, elongated mounting member fixedly attached to said utility pole;
   b) a selectively actuable, wire tension adjustment mechanism operably connected to said second, elongated mounting member;
   c) a third, elongated tubular member having proximal and distal ends, and a longitudinal axis which extends essentially perpendicularly outwardly from said utility pole, said third, elongated tubular member being positioned with its said proximal end in biased relation to said wire tension adjustment mechanism, wherein actuation of said adjustment mechanism effects movement of said third, elongated tubular member along its said longitudinal axis;
   d) a pulley rotatably attached to said distal end of said third, elongated tubular member and being laterally spaced a predetermined distance from said utility pole, and said wire passing over said pulley and bearing thereagainst, whereby said bearing force maintains said third, elongated tubular member in biased relation to said wire tension adjustment mechanism; and
   e) means for supporting said third, elongated tubular member.

11. The combination of claim 10 wherein said selectively actuable, wire tension adjustment mechanism includes:
   a) an elongated, threaded shaft partially positioned within said third, elongated tubular member and having a longitudinal axis and being adapted to be fixedly attached to said utility pole, whereby said threaded shaft extends perpendicularly outwardly from said utility pole;

b) a nut threadingly attached to said threaded shaft, and being positioned in biased relation to said third, elongated tubular member and adjacent to said second, elongated mounting member, whereby selective rotation of said nut produces movement thereof along said threaded shaft's longitudinal axis, thereby effecting movement of said third, elongated tubular member along its said longitudinal axis which, in turn, changes said predetermined lateral distance separating said pulley from said pole which, consequently, changes said tension in said wire.

12. The combination of claim 10 wherein said means for supporting said third, elongated tubular member includes:
   a) a fourth, elongated tubular member positioned in sleeve-like relation to said third, elongated tubular member, adjacent said distal end thereof; and
   b) a strut having opposite first and second ends, said first end being integrally attached to, and said strut extending diagonally away from said fourth, elongated tubular member, said strut's second end being fixedly attached to said second, elongated mounting member.

13. The combination of claim 10 wherein said second, elongated mounting member has a cross-sectional shape adapted to conform to said contour of said utility pole.

14. The combination of claim 13 wherein said elongated mounting member has a cross-sectional shape adapted to conform to said contour of said utility pole.

15. A combination of an apparatus for supporting a plurality of power lines in vertically spaced relation above the ground and in laterally offset relation to a utility pole having a predetermined contour, and an upper and a lower end, and an apparatus for maintaining said utility pole in a vertical orientation and in a statically balanced condition, said combination of apparatus comprising:
   a) means for supporting said plurality of power lines in laterally offset relation to said utility pole;
   b) a wire having a predetermined tension, and opposite first and second ends adapted to be attached to said utility pole's upper and lower ends, respectively;
   c) a pulley assembly interconnected to said utility pole for maintaining said utility pole in an essentially vertical orientation, said assembly including:
      i) an elongated mounting member fixedly attached to said utility pole;
      ii) a selectively actuable, wire tension adjustment mechanism operably connected to said first, elongated mounting member;
      iii) a first, elongated tubular member having proximal and distal ends, and a longitudinal axis said first, elongated tubular member being positioned with its said proximal end in biased relation to said wire tension adjustment mechanism, wherein actuation of said adjustment mechanism effects movement of said first, elongated tubular member along its said longitudinal axis, whereby said longitudinal axis extends perpendicularly outwardly from said utility pole;
      iv) a pulley rotatably attached to said distal end of said first, elongated tubular member with said wire passing over said pulley and bearing thereagainst, whereby when said pulley is laterally spaced a predetermined distance from said utility pole, said bearing force maintains said first, elongated tubular member in biased relation to said wire tension adjustment mechanism;
      v) means for supporting said first, elongated tubular member; and
   d) means for interconnecting said pulley assembly to said utility pole.

16. The combination of claim 15 wherein said selectively actuable, wire tension adjustment mechanism includes:
   a) an elongated, threaded shaft partially positioned within said first, elongated tubular member and having a longitudinal axis, whereby it may be fixedly attached to said utility pole with said threaded shaft extending perpendicularly outwardly from said utility pole;
   b) a nut threadingly attached to said threaded shaft, and being positioned in biased relation to said first, elongated tubular member and adjacent to said elongated mounting member, whereby selective rotation of said nut produces movement thereof along said threaded shafts longitudinal axis, thereby effecting movement of said first, elongated tubular member along its said longitudinal axis which, in turn, changes said predetermined lateral distance separating said pulley from said pole which, consequently, changes said tension in said wire.

17. The combination of claim 15 wherein said means for supporting said first elongated tubular member includes:
   a) a second, elongated tubular member positioned in sleeve-like relation to said first, elongated tubular member, adjacent said distal end thereof; and
   b) a strut having opposite first and second ends, said first end being integrally attached to, and said strut extending diagonally away from said second, elongated tubular member, said strut's second end being fixedly attached to said second, elongated mounting member.

* * * * *